United States Patent [19]
Lambeth et al.

[11] Patent Number: 5,993,956
[45] Date of Patent: Nov. 30, 1999

[54] MANGANESE CONTAINING LAYER FOR MAGNETIC RECORDING MEDIA

[75] Inventors: David N. Lambeth, Pittsburgh, Pa.; Li-Lien Lee, Santa Clara, Calif.; David E. Laughlin, Pittsburgh, Pa.

[73] Assignee: Carnegie Mellon University, Pittsburgh, Pa.

[21] Appl. No.: 08/844,835

[22] Filed: Apr. 22, 1997

[51] Int. Cl.$^6$ ................................................ G11B 5/66
[52] U.S. Cl. ..................... 428/332; 428/336; 428/694 T; 428/694 TS; 428/900; 204/192.2; 427/128; 427/129; 427/130; 427/131
[58] Field of Search .................... 428/694 T, 694 TS, 428/332, 336, 900; 204/192.2; 427/128, 129, 130, 131

[56] References Cited

U.S. PATENT DOCUMENTS

| | | | |
|---|---|---|---|
| 4,652,499 | 3/1987 | Howard | 428/641 |
| 5,118,564 | 6/1992 | Shinohara et al. | 428/336 |
| 5,162,158 | 11/1992 | Christner | 428/611 |
| 5,456,978 | 10/1995 | Lal | 428/332 |
| 5,506,017 | 4/1996 | Ranjan | 428/65.7 |
| 5,605,733 | 2/1997 | Ishikawa | 428/65.3 |

OTHER PUBLICATIONS

Feng et al., "Interdiffusion and Grain Isolation in Co/Cr Thin Films", IEEE Transactions on Magnetics, vol. 30, No. 6, pp. 3948–3950 (Nov. 1994).
Porter et al., "Phase Transformations in Metals and Alloys", pp. 98–102, Van Nostrand Reinhold Company, 1980.
Cahn et al., editors, "Physical Metallurgy", Part I, pp. 448–454, North–Holland Physics Publishing (1983).
Massalski et al., editors, "Binary Alloy Phase Diagrams", $2^{nd}$ Ed, pp. 1205, 1207–1208, 1291–1293, 2573, 2575, 2615–2617, 2620, 2622–2623 ASM International (1996).

*Primary Examiner*—Leszek Kiliman
*Attorney, Agent, or Firm*—Kirkpatrick & Lockhart LLP

[57] ABSTRACT

The present invention provides for a magnetic recording media incorporating Mn-containing layers between a substrate and a magnetic layer to provide media having increased coercivity and lower noise. The Mn-containing layer can be incorporated in a rotating, translating or stationary recording media to operate in conjunction with magnetic transducing heads for recording and reading of magnetic data, as well as other applications. The magnetic recording medium of the invention preferably includes a Co or Co alloy film magnetic layer, and Mn-containing layer, preferably comprised of VMn, TiMn, MnZn, CrMnMo, CrMnW, CrMnV, and CrMnTi, and most preferably a CrMn alloy, disposed between the substrate and the magnetic layer to promote an epitaxial crystalline structure in the magnetic layer. The medium can further include seed layers, preferably polycrystalline MgO for longitudinal media, underlayers, and intermediate layers. Underlayers and intermediate layers are comprised of materials having either an A2 structure or a B2-ordered crystalline structure disposed between the seed layer and the magnetic layer. Materials having an A2 structure are preferably Cr or Cr alloys, such as CrV, CrMo, CrW and CrTi. Materials having a B2-ordered structure having a lattice constant that is substantially comparable to that of Cr, such as those preferably selected from the group consisting of NiAl, AILCo, FeAl, FeTi, CoFe, CoTi, CoHf, CoZr, NiTi, CuBe, CuZn, A-LMn, AlRe, AgMg, and $Al_2FeMn_2$, and is most preferably FeAl or NiAl.

40 Claims, 12 Drawing Sheets

MANGANESE CONTAINING LAYER FOR MAGNETIC RECORDING MEDIA

STATEMENT REGARDING FEDERALLY SPONSORED RESEARCH OR DEVELOPMENT

This work was supported in part under a Department of Energy contract, No. DE-FG02-90ER45423 The government has certain rights to this invention.

BACKGROUND OF THE INVENTION

The present invention is directed generally to magnetic recording media and devices incorporating the media and, more particularly, to manganese (Mn) containing layers for use with cobalt or cobalt alloy based magnetic layers in the formation of magnetic recording media.

There is an ever increasing demand for magnetic recording media with higher storage capacity, lower noise and lower costs. To meet this demand, recording media have been developed with increased recording densities and more well-defined grain structures that have substantially increased the storage capacity, while lowering the associated noise of the recording media. However, the rapid increases in recording densities over the last two decades, combined with the proliferation of personal computers have only served to fuel the demand for even higher storage capacity recording media having lower noise and cost.

Magnetic discs and disc drives are commonly used to provide quick access to vast amounts of stored information. Both flexible (floppy)and rigid (hard) discs are available. Data are stored in magnetic bits in segmented circular tracks on the discs. Disc drives typically employ one or more discs rotated on a central axis. A magnetic head, or slider, is positioned over the disc surface to either access or add to the stored information. The heads for disc drives are mounted on a movable arm that carries the head in very close proximity to the disc over the various tracks and segments.

The structure of a typical thin film disk is multilayered and includes a substrate at its base covered by an underlayer, a magnetic layer and optionally, an overlayer at the top. The overlayer may be coated with an overcoat and an organic lubricant.

The magnetic layer is the main body on which the magnetic bits are recorded. Recording media comprised of cobalt or cobalt alloy-based magnetic films having a chromium or chromium alloy-based underlayer deposited on a nonmagnetic substrate have become the industry standard.

Magnetic properties, such as coercivity ($H_c$), remanant magnetization ($M_r$) and coercive squareness ($S^*$), are crucial to the recording performance of the Co alloy thin film. The magnetic properties are primarily dependent on the microstructure of the film for a fixed composition. For thin film longitudinal magnetic recording media, the desired crystalline structure, or texture, of the Co and Co alloys is hexagonal close packed (HCP) with uniaxial crystalline anisotropy and a magnetization easy direction along the c-axis predominately in the plane of the film (i.e, in-plane). Usually, the better the in-plane c-axis crystallographic texture, the higher the coercivity of the Co alloy thin film used for longitudinal recording. High coercivity is required to achieve a high remanence. Likewise, for perpendicular magnetic recording media, the desired crystalline structure of the Co alloys is HCP with the uniaxial anisotropy and crystalline c-axis perpendicular to the film plane. For very small grain sizes coercivity increases with increased grain size. Large grains, however, results in greater noise. There is a need to achieve high coercivities without the increase in noise associated with large grains. To achieve a low noise magnetic medium, the Co alloy thin film should have uniform small grains with grain boundaries which can magnetically isolate neighboring grains. This kind of microstructure and crystallographic texture is normally achieved by manipulating the deposition process, by grooving the substrate surface, by varying the cobalt alloy composition or by the proper use of an underlayer.

Cobalt-based alloys as opposed to pure cobalt are commonly used in longitudinal and perpendicular magnetic media for a variety of reasons. For example, non-magnetic elements such as Cr are commonly bulk doped into the magnetic film to lower the magnetization. This is especially important in perpendicular media where the demagnetization energy associated with the magnetic moment of the alloy must be less than the magneto-crystalline anisotropy energy in order for the magnetization to be oriented perpendicular to the media film plane. The same technique is used in longitudinal magnetic media to lower the flux transition demagnetization energy, resulting in a shorter flux transit-on length and, hence, higher recording densities. Even more importantly, however, non-magnetic elements are introduced into the Co-alloy to limit the magnetic exchange coupling between cobalt grains. It is believed that preferential diffusion of elements such as Cr, Ta, P, B, or Si from the bulk of the magnetic grain to the grain boundaries during film growth help to isolate the individual grains by reducing the magnetic exchange coupling between grains. This then results in a significantly lower media noise. For example, Deng et al. found that the addition of small amounts of Ta to CoCr alloys resulted in the increased Cr diffusion to the grain boundaries. See Youping Deng, David N. Lambeth, and David E. Laughlin, "Structural Characteristics of Bias Sputtered CoCrTa/Cr Films", IEEE Transactions on Magnetics, Vol. 29, no. 5, September 1993, pp. 3676–3678.

Underlayers can strongly influence the crystallographic orientation, the grain size and as discussed herein the chemical segregation at the Co alloy grain boundaries. Underlayers which have been reported in the literature include Cr, Cr with an additional alloy element X (X=C, Mg, Al, Si, Ti, V, Co, Ni, Cu, Zr, Nb, Mo, La, Ce, Nd, Gd, Tb, Dy, Er, Ta, and W), Ti, W, Mo, NiP and B2-ordered lattice structures, such as NiAl and FeAl. While there would appear to be a number of underlayer materials available, in practice, only a very few work well enough to meet the demands of the industry. Among them, the most often used and the most successful underlayer is pure Cr.

For high density longitudinal recording, in plane orientation has heretofore been achieved by grain-to-grain epitaxial growth of the HCP Co alloy thin film on a body centered cubic (BCC) Cr underlayer. The polycrystalline Co-based alloy thin film is deposited with its c-axis, the [0002] axis, either parallel to the film plane or with a large component of the c-axis in the film plane. It has been shown by K. Hono, B. Wong, and D. E. Laughlin, "Crystallography of Co/Cr bilayer magnetic thin films", Journal of Applied Physics 68 (9) p. 4734 (1990), that BCC Cr underlayers promote grain-to-grain epitaxial growth of HCP Co alloy thin films deposited on these underlayers. The heteroepitaxial relationships between Cr and Co which bring the [0002] axis down or close to the film plane are $(002)_{Cr}//(110)_{Co}, (110)_{Cr}//(101)_{Co}, (110)_{Cr}//(100)_{Co}$, and $(112)_{Cr}//(100)_{Co}$. Different Co/Cr epitaxial relationships prevail for different deposition processes. To obtain a good BCC structure which promotes the formation of the HCP structure, the Cr underlayer should be thicker than about 50 Å.

Likewise, to achieve perpendicular high density recording media, the perpendicular orientation of the Co c-axis with respect to the film plane has usually been obtained by grain-to-grain epitaxial growth of the HCP Co alloy thin film to an oriented HCP underlayer of (0002) crystalline texture or a face centered cubic (FCC) crystal underlayer of (111) crystalline texture. Ti and $Ti_{90}Cr_{10}$ at % are often cited as the best seed layers for this purpose, although other seed layers, such as Pt, CoO/Pt and non-magnetic CoCr35at % have been used to induce this structure. See "Development of High Resolution and Low Noise Single-layered Perpendicular Recording Media for High Density Recording", IEEE Trans. Magn., Vol. 33, no. 1, p. 996–1001 (January. 1997); "Compositional separation of CoCrPt/Cr films for longitudinal recording and CoCr/Ti films for perpendicular recording" IEEE Trans. Magn., Vol. 27, no. 6, part 2, pp. 4718–4720 (1991); "Properties of CoCrTa Perpendicular films prepared by sputtering on Pt underlayer", J. MMM, Vol. 155, no. 1–3, pp. 206–208 (1996); IEEE Trans. Magn. Vol. 32, no. 5, pp. 3840–3842 (September. 1996); IEEE Trans. Magn. Vol. 30, no. 6, pp. 4020–4022 (November. 1994); and, "Development of High Resolution and Low Noise Single-layered Perpendicular Recording Media for High Density Recording", IEEE Trans. Magn. Vol. 33, no. 2, pp. 996–1001) (January. 1997).

U.S. Pat. No. 4,652,499 discloses efforts to improve the underlayer of longitudinal magnetic media by adding vanadium (V) to Cr to change its lattice constant and thereby to promote a better lattice matching between the HCP Co alloys, such as CoPt or CoPtCr, and the BCC CrV underlayer. In addition, U.S. Ser. No. 08/315,096 now U.S. Pat. No. 5,693,426, which is incorporated herein by reference, discloses a new group of underlayers including materials having a B2-ordered crystalline structure, such as NiAl and FeAl.

Additional improvements in the structure of the magnetic layer have been found when incorporating intermediate layers between the underlayer and the magnetic layer. Also, seed layers can be incorporated between the underlayer and the substrate to provide additional control of the structure of the underlayer and to prevent contamination of the underlayer by the substrate contaminants. The seed layers, underlayers, and intermediate layers are collectively referred to herein as the underlayer structure. In addition, multiple magnetic layers that may or may not be separated by a Cr inner layer are sometimes employed to produce variations in the magnetic properties of the resulting film. The magnetic layers and intervening inner layers are collectively referred to herein as the magnetic layer structure.

The use of multi-layered underlayer and magnetic layer structures can provide for increased control over the grain size, the grain to grain epitaxial growth of subsequent layers and the surface roughness of the magnetic layers. However, the use of additional layers may also increase the overall cost and complexity of the manufacturing process.

The need for lighter, smaller and better performing and less costly computers with greater storage density demands higher density recording media for use in hard disk drives, other magnetic storage devices, and other applications. It is an object of the present invention to meet those demands with a magnetic recording media having high coercivity and low noise.

BRIEF SUMMARY OF THE INVENTION

The present invention is directed to the use of Mn-containing layers between a substrate and a magnetic layer, or in contact with the magnetic layer, to provide magnetic recording media having increased coercivity and lower media noise. The Mn-containing layer may be incorporated in the underlayer structure, the magnetic layer structure, or the overlayer to provide for a recording media having higher coercivity and lower noise. The recording media can be incorporated in a rotating, translating, or stationary data storage device for use in conjunction with magnetic transducing heads for the recording and reading of magnetic data, as well as other applications.

The magnetic recording medium of the invention preferably includes a Co or Co alloy magnetic layer, and a Mn-containing layer formed from Mn, VMn, TiMn, MnZn, CrMnMo, CrMnW, CrMnV, or CrMnTi, and most preferably CrMn, disposed between the substrate and the magnetic layer. The Co or Co alloy magnetic layer has an HCP structure and is deposited with its c-axis, the magnetic easy axis (the direction in which it is easily magnetized), substantially parallel to the plane of the magnetic layer for longitudinal media and, for perpendicular media, substantially perpendicular to the plane of the magnetic layer.

The medium can further include additional layers in the underlayer structure, such as seed layers, underlayers, and intermediate layers. Polycrystalline MgO is a preferred seed layer for longitudinal media. The underlayers and/or intermediate layers used in addition to the Mn-containing layer generally include materials having either an A2 structure or a B2-ordered crystalline structure disposed between the seed layer and the magnetic layer. Materials having an A2 structure are preferably Cr or Cr alloys, such as CrV, CrMo, CrW, or CrTi. Materials having a B2-ordered structure having a lattice constant that is substantially comparable to that of Cr, such as those preferably selected from the group consisting of NiAl, AlCo, FeAl, FeTi, CoFe, CoTi, CoHf, CoZr, NiTi, CuBe, CuZn, AlMn, AlRe, AgMg, and $Al_2FeMn_2$, and is most preferably FeAl or NiAl. An intermediate Mn-containing layer is preferably disposed between the underlayer and the magnetic layer. In addition, the underlayer may be formed in multiple layers wherein each layer is a different one of the foregoing materials.

Move than one magnetic layer can be incorporated in the media and it can also include one or more inner layers disposed between the magnetic layers. The inner layers are typically about 10 to 40 Å thick and composed of Cr, but can also be the Mn-containing layers of the present invention.

The magnetic layer may be covered by an overlayer, which, in turn, may be covered by an overcoat. An organic lubricant is preferably added over the overcoat to reduce frictional wear of the media. The overlayer may be comprised of Mn or a Mn-containing alloy.

Accordingly, the present invention provides magnetic recording media and data storage devices incorporating recording media having high coercivity and lower noise and cost for use in hard disk drives and other applications. These advantages and others will become apparent from the following detailed description;

BRIEF DESCRIPTION OF THE DRAWINGS

The advantages of the present invention can be better understood by reference to the drawings in which.

DETAILED DESCRIPTION OF THE INVENTION

The recording media of the invention can be embodied in a rotating, translating, or stationary data storage device, such as a rigid magnetic disc incorporated into a disc drive (not shown). Typically, the disc drive includes a magnetic transducing head, or slider, supported on a movable arm in a suspension assembly used for moving the head over the surface of the disc. The transducing head is maintained in a closely spaced, parallel relationship relative to the surface of the disc during normal operation. A typical distance between the head and the disc is 10 μin or less. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs, floppy discs, or tape using known flexible substrates.

Figure 1C:
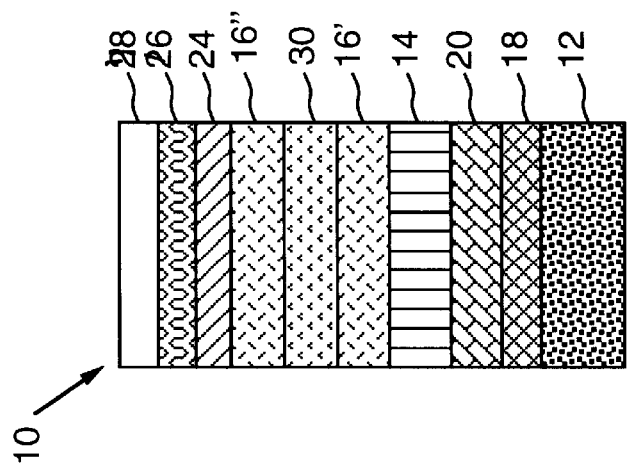
FIG. 1(a)–(c) are schematic illustrations of several embodiments of a multi-layer structure of the thin film disk of the present invention.
Figure 1B:
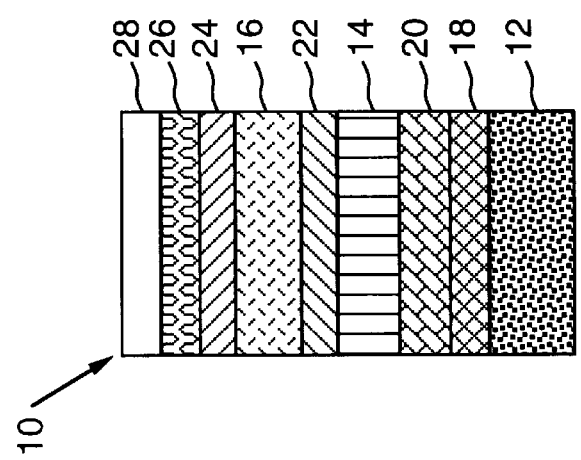
Figure 1A:
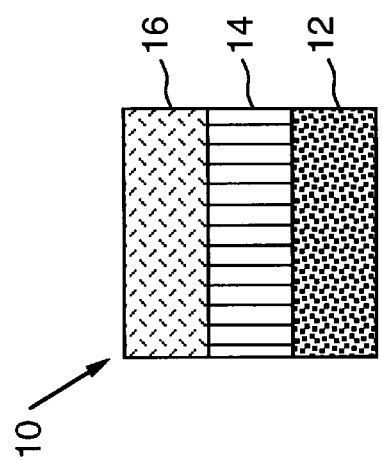

Referring to FIG. 1(a), the magnetic recording medium 10 of the present invention is comprised of a substrate 12, a Mn-containing layer 14, and a magnetic layer 16. In addition, as shown in FIG. 1(b), a seed layer 18 can be disposed on the substrate 12, as well as an underlayer 20.

An intermediate layer 22 may also be disposed between the Mn-containing layer 14 and the magnetic layer 16. The magnetic layer 16 can be covered using an overlayer 24 followed by an overcoat 26 and an organic lubricant 28. In another embodiment, shown in FIG. 1(c), there may be first and second magnetic layers, 16' and 16", having one or more inner layers 30 disposed between the first magnetic layer 16' and a second magnetic layer 16".

In a preferred embodiment, the Mn-containing layer 14 has zero magnetic moment and is in contact with a Co or Co alloy magnetic layer 16. However, it should be appreciated that the Mn-containing layer can be included in the media 10 as a seed layer, an underlayer, an inner layer, or an overlayer, in addition to, or in lieu of, its use as an intermediate layer. Higher coercivities have been obtained in the resulting media 10, when the Mn-containing layer 14 and the magnetic layer 16 are in contact, as opposed to embodiments incorporating an intermediate layer 22 between the Mn-containing layer 14 and the magnetic layer 16.

An effective amount of Mn is used to produce a Mn-containIng layer that is sufficiently thick to produce an epitaxial crystalline structure in the magnetic layer 16 and to provide a sufficient amount of Mn to diffuse to the grain boundaries of the crystallites of the magnetic layer 16 that results in the magnetic media 10 having desired magnetic properties. For example, it is desirable that the magnetic coercivities exceed those produced in the absence of the Mn-containing layer or are comparable to or exceed those in the prior art.

In a current embodiment, employing a CrMn alloy as the Mn-containing layer, the desired magnetic properties can be achieved when the CrMn layer is preferably at least 3 nm thick, and most preferably greater than 10 nm thick. The skilled artisan will appreciate that, based on guidance provided herein, Mn-containing layers thinner than 3 nm may also be effective at producing the desired magnetic properties. However, there may be a minimum effective amount of Mn that can be added to the magnetic media structure below which the enhanced magnetic properties will not be observed.

Sputter depositing the Mn-containing layer at room temperature provides magnetic media having magnetic properties comparable to magnetic media employing a Cr layer in place of the Mn-containing layer. An incentive to use the CrMn in place of a pure Cr even for room temperature processes is that Mn is less expensive than Cr. As most of the Cr targets are manufactured by powder metallurgy methods, powder consolidated CrMn targets should be cheaper than a Cr target.

In a preferred embodiment, the Mn-containing layer 14 and the magnetic layer 16 are sputter deposited on a substrate 12 that has been preheated to an elevated temperature, such as 250° C. The resulting media 10 containing the Mn-containing layer 14 has higher coercivity than media 10 produced without preheating the substrate 12. It is expected that the elevated temperature selected for depositing the magnetic layer 16 will be a function of the deposition rate and also that the heating can be performed during or after the production of the magnetic layer 16. For example, commercial deposition rates are substantially higher; therefore, it may be necessary to increase the temperature above 250° C. to achieve the increased magnetic properties observed at lower deposition rates.

The increase in coercivity with increasing deposition temperatures may result from the increased diffusion of Mn across the CrMn/magnetic layer interface. With the proper processing time and temperature, a preferred diffusion of material is to the grain boundary as opposed to the bulk of the grains. See "Phase Transformations in Metals and Alloys" by David A. Porter and Kenneth E. Easterling, Publisher: Van Nostrand Reinhold Company, pages 98–102; and, "Physical Metallurgy, Part 1", edited by R. W. Cahn and P. Haasen, Publisher: North-Holland Physics Publishing. Interlayer diffusion of other alloying elements is described further in "Interdiffusion and Grain Isolation in Co/Cr Thin Films", Y. C. Feng, D. E. Laughlin and D. N. Lambeth, IEEE Transactions on Magnetics, Vol. 30, No. 6, (November. 1994), which is incorporated herein by reference. One skilled in the art will appreciate that the temperature at which the Mn-containing layer, as well as the Co alloy, is disposed on the media 10 can be varied to produce media having a range of magnetic properties. In fact, as discussed in the above cited Feng reference, one skilled in the art will appreciate that a thermal post treatment, such as a slow anneal or a rapid thermal anneal (RTA), could be used to promote Mn diffusion from the Mn-containing layer to the grain boundaries of the Co alloy magnetic layer.

Figure 2A:
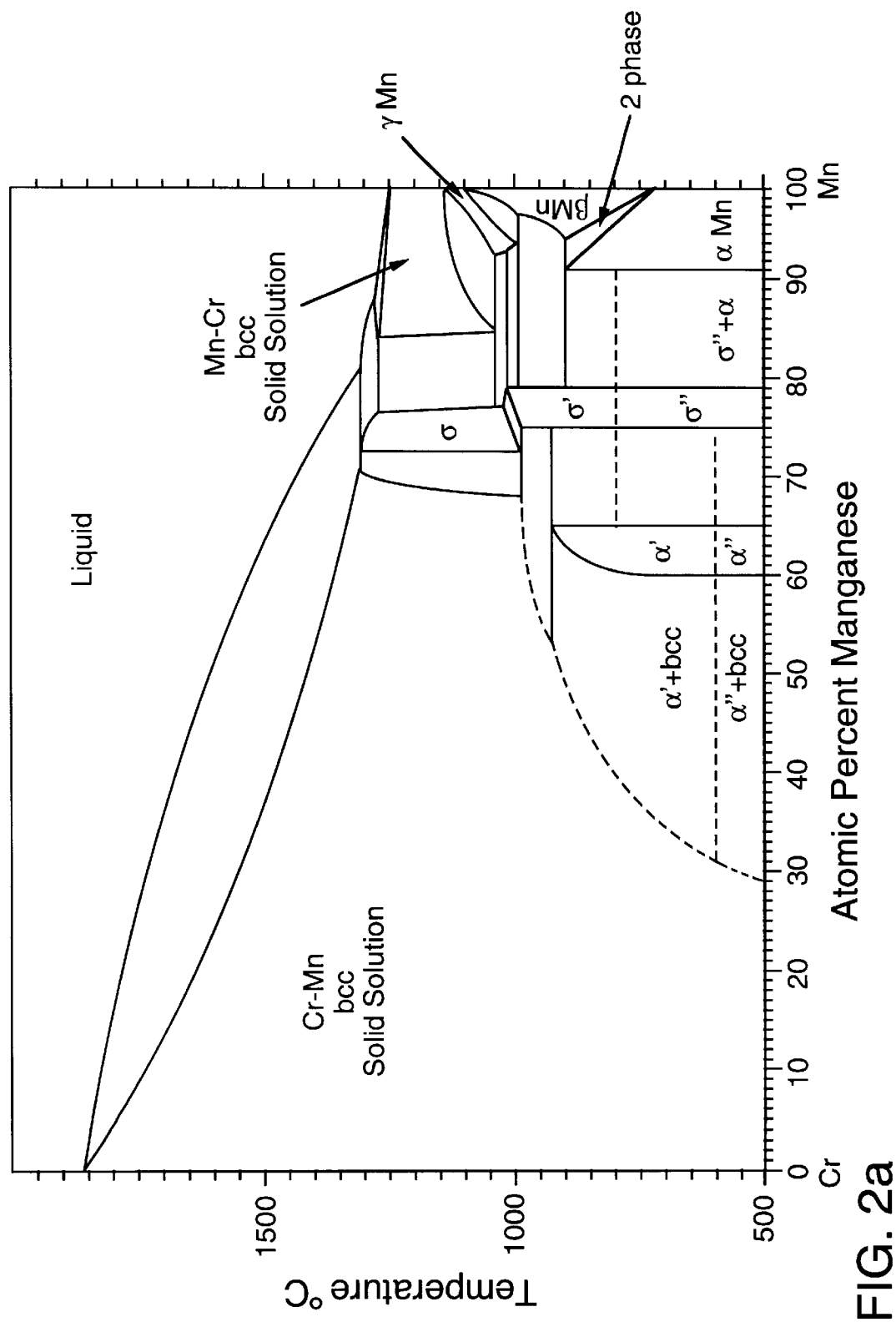
FIG. 2a shows Cr—Mn equilibrium phase diagram.

The solid solution Mn alloy of the present invention are preferably VMn, TiMn, MnZn, CrMnMo, CrMnW, CrMnV, or CrMnTi, and most preferably a substitutional solid solution CrMn alloy of Mn dissolved in Cr. As shown in FIG. 2a, bulk Cr can dissolve large quantities of Mn to form substitutional solid solutions. The solubility of Mn in Cr is estimated to be greater than 25 at % at room temperature based on FIG. 2a. Preferably, the CrMn alloy contains at least 10 at % Mn, and most preferably, at least 20 at % Mn, for compositions produced using the currently preferred method of preparing the media. Phase diagrams containing express citations of a number of specific phase transition temperatures for the binary a-loys shown in FIG. 2a–2e can be found in "Binary Alloy Phase Diagrams", $2^{nd}$ ed. plus updates, ASM International (1996), the pertinent parts of which are incorporated herein by reference.

Because the atomic volume of Mn (0.01224 $nm^3$/atom) is only slight larger than that of Cr (0.01200 $nm^3$/atom), the lattice parameter of the Cr is virtually unchanged even for a 25 at % Mn CrMn alloy. This differs from other Cr alloys, such as CrV, in which the vanadium is added to the Cr to change the lattice constant of the Cr layer to better match the lattice constant of the magnetic layer.

Figure 2B:
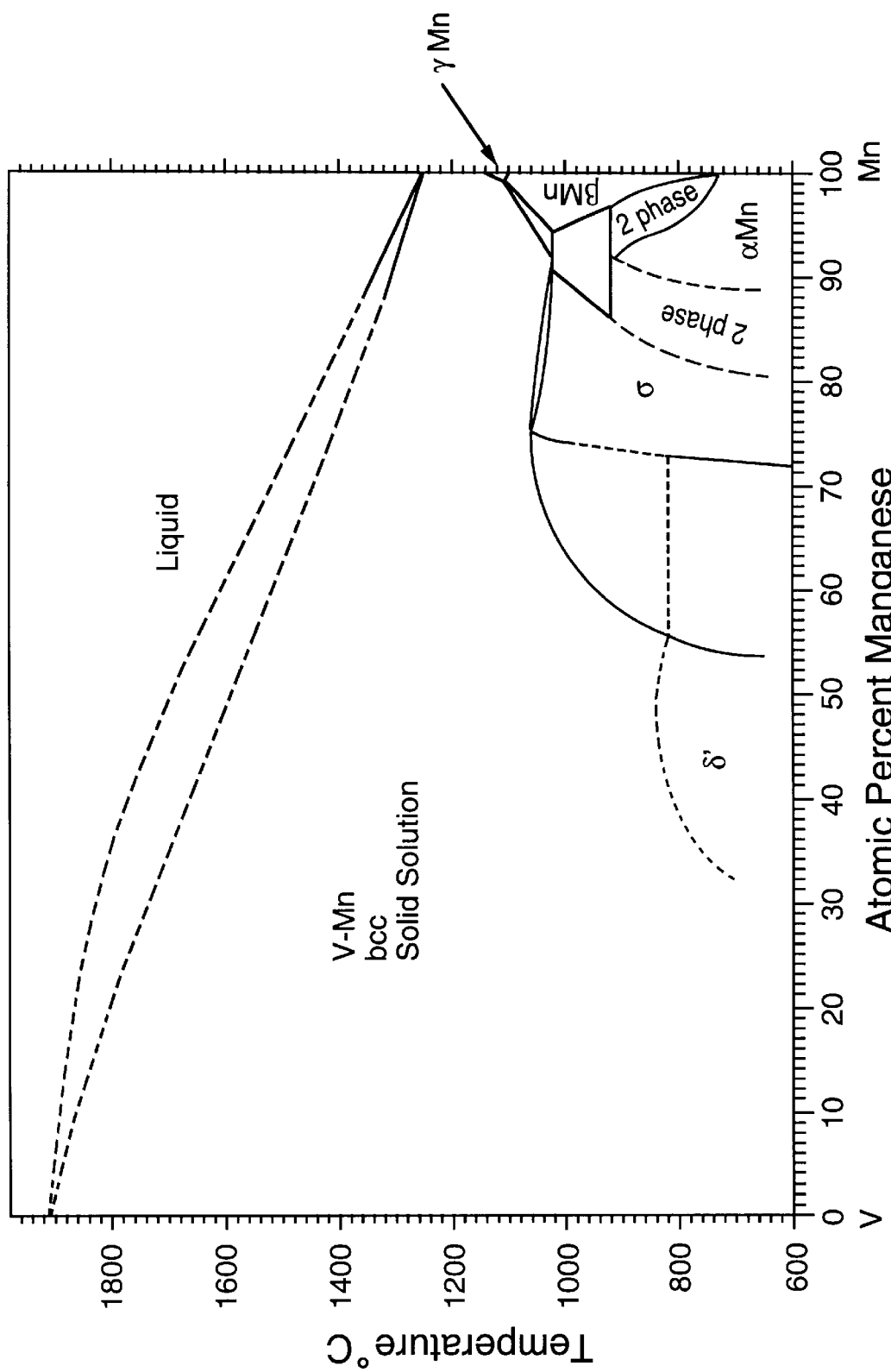
FIG. 2b shows V—Mn equilibrium phase diagram.

In a similar manner, FIG. 2b shows that a substantial amount of Mn can be placed into solid solution with V. Likewise, amounts of both V and Mn can be combined with Cr. Since the atomic lattice size of V is larger than that of Cr it can be used to adjust the solid solution atomic spacing to lattice match to and induce epitaxial growth of Co-alloys.

Figure 2C:
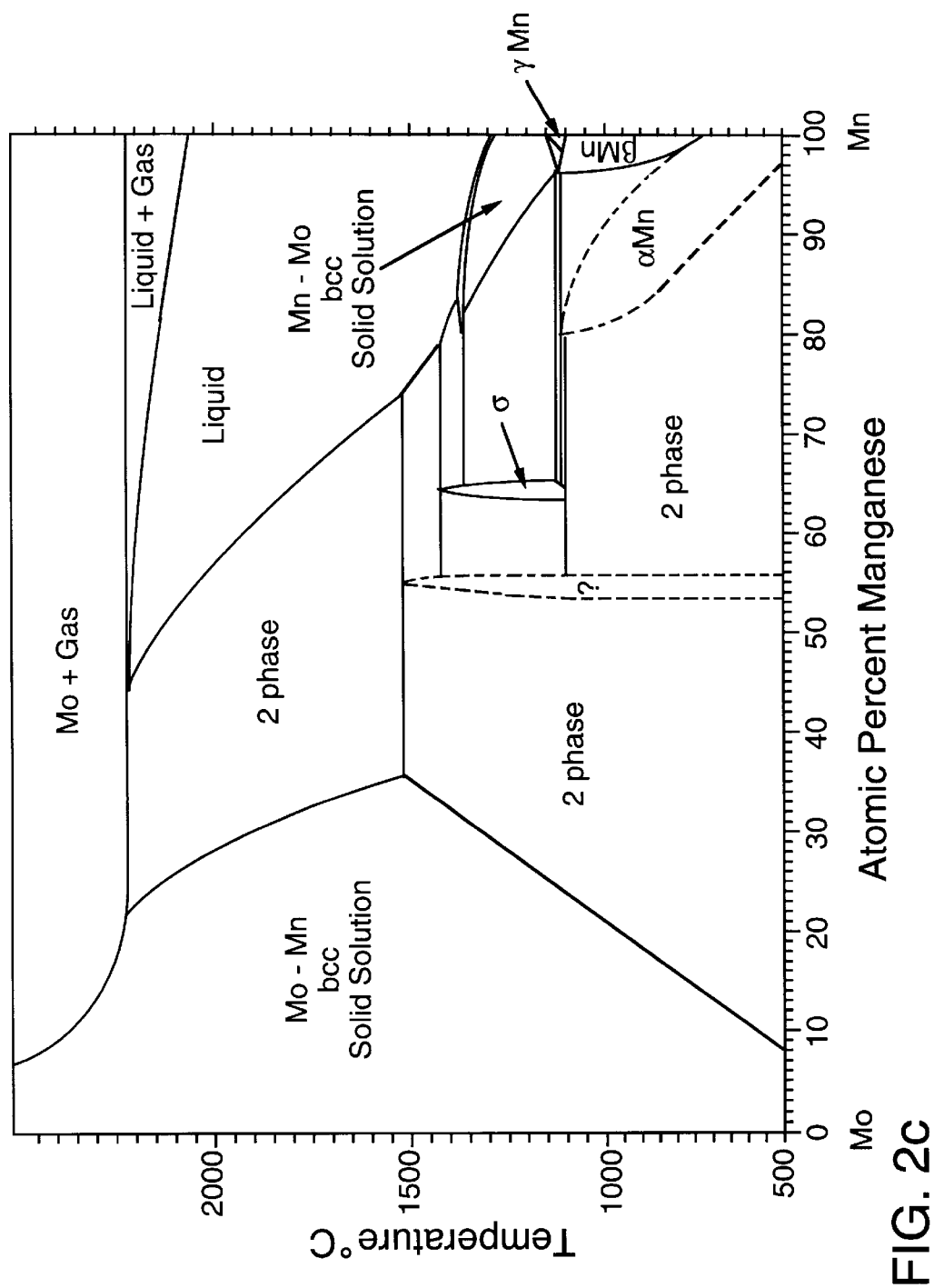
FIG. 2c shows Mo—Mn equilibrium phase diagram.

Sirrilarly, FIG. 2c shows that a limited amount of Mn can be placed into substitutional solid solution with Mo. While the atomic lattice spacing of Mo (3.14 Å) is large compared to Cr (2.88 Å), limited amounts of Mo can be placed into solid solution of CrMn to form CrMnMo alloys.

Figure 2D:
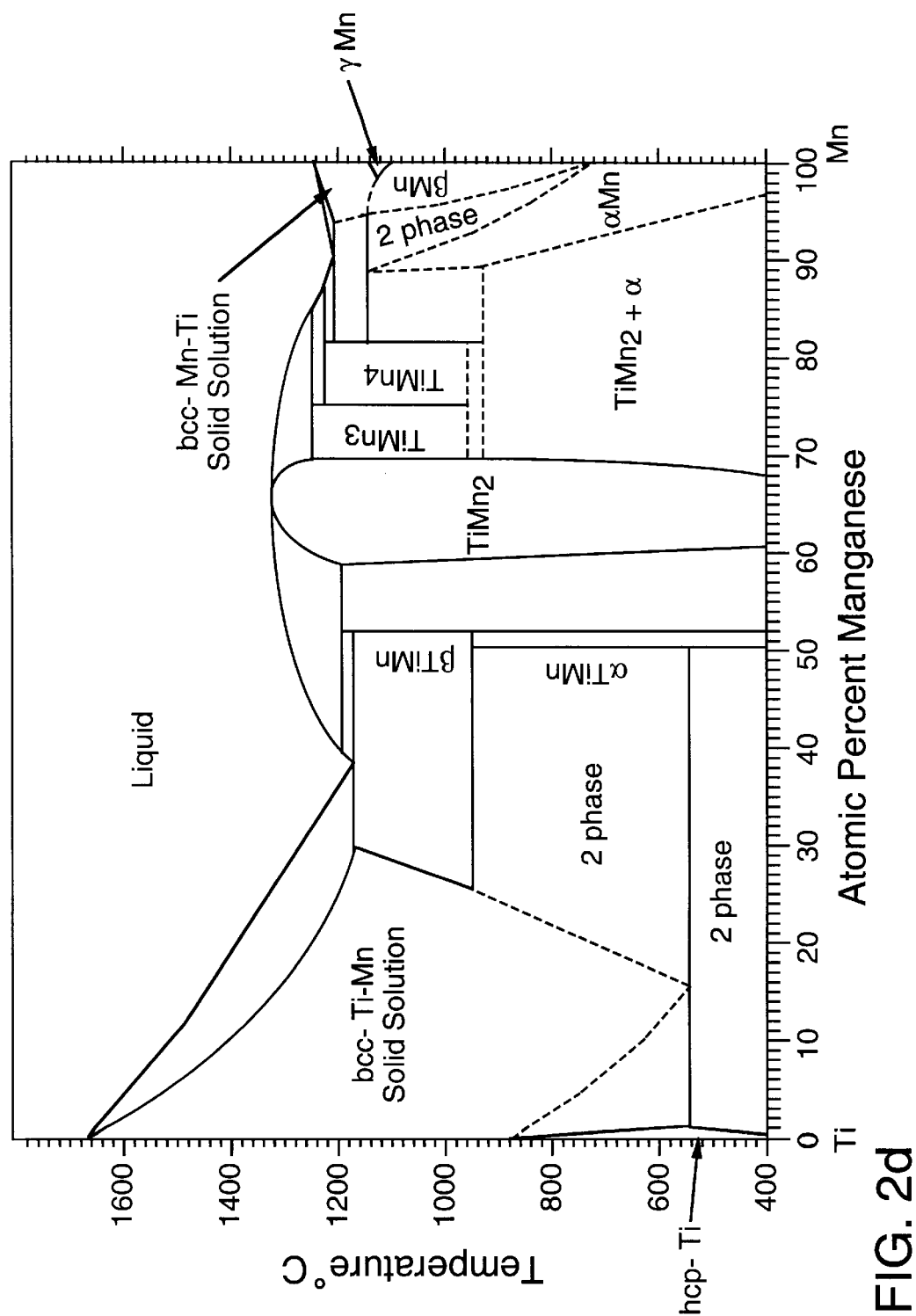
FIG. 2d shows Ti—Mn equilibrium phase diagram.

FIG. 2d shows the phase diagram for TiMn. At elevated temperatures, substantial amounts of Mn can be placed into solid solution with β-Ti(bcc) The formation of this crystal structure as an intermediate layer is favorable even at lower temperatures when epitaxially grown on an underlayer chosen to promote epitaxial growth of the magnetic layer. Likewise, limited amounts of Ti can be placed into CrMn to adjust the solid solution atomic lattice spacing.

The Mn-containing layer can provide for epitaxial growth of the magnetic layer by either providing a template for epitaxial growth of the magnetic layer or by propagating a template formed by an underlayer. In a preferred embodiment, solid solution Mn alloys that provide a template for epitaxial growth of the magnetic Co alloy and provide a source of Mn for diffusion to the grain boundaries of the Co alloy magnetic layer are used as the Mn-containing layer 14. One skilled in the art should appreciate the optimum percent of Mn used in the Mn-containing layer will depend, in part, on the method, including the temperature and deposition rate, used to prepare the Mn-containing layer When an Mn-containing layer is used as an intermediate layer, the underlayer or underlayers may or may not contain Mn. If the underlayer is selected to provide the template for epitaxial crystalline growth of the magnetic layer, it is only necessary for the Mn-containing intermediate layer to propagate the template for epitaxial growth of the magnetic layer formed by the underlayer.

In the preferred embodiment, the substrate 12 is formed of a nonmagnetic material, such as glass, silicon or an aluminum alloy coated with NiP. Alternative hard disk substrates such as glass ceramic, ceramic, or SiC may be used.

For longitudinal media, the magnetic layers, 16, 16', and 16", are deposited with the longitudinal magnetic easy axis thereof substantially parallel to the plane of such magnetic layer. The magnetic layers 16 for longitudinal media are preferably a Co or Co alloy film, such as CoCr, CoSm, CcoPr, CoP, CoNi, CoPt, CoNiCr, CoNiZr, CoPtNi, CoCrTa, CoCrPt, CoCrP, CoCrTaSi, CoCrPtSi, CoCrPtB, CoCrPtTa, CoCrPtTaB, CoCrPtTaNb or other known Co alloy magnetic films and are each about 2.5–60 nm (25–600 Å) thick.

The seed layer 18 can be a Cr, a Cr alloy or a B1-ordered crystalline structure with a (002) texture. The preferred seed layer for embodiments employing the seed layer 18 is a thin layer of Cr or MgO having a (002) texture. Polycrystalline MgO can be produced having this texture by sputter depositing the MgO on the substrate 12 as described in U.S. pat. application Ser. No. 08/553,893 now U.S.Pat. No. 5,800, 931, which is herein incorporated by reference. The seed layer forms a substantially continuous layer up to 50 nm in thickness, and preferably up to 20 nm in thickness. In the preferred embodiment, the seed layer is about 1.0 nm to 50 nm (10 to 500 Å) in thickness, and preferably between about 1.0 nm to 20 nm (10 to 200 Å) in thickness, most preferably about 2.5 to 20 nm (25 to 200 Å) in thickness, and most preferably between about 2.5 nm to 10 nm (25 to 100 Å) in thickness.

The underlayer 20 is generally comprised of a material suitable for producing epitaxial growth of the magnetic layer 16. Epitaxial growth of the magnetic layer 16 is promoted using an underlayer 20 that has a crystal structure and an atomic spacing that is preferably comparable to or a multiple of an atomic spacing of the magnetic layer. For example, a material can be chosen for the underlayer that has an integer number (n) of atomic spacings equal to an integer number (m) of atomic spacings of the magnetic layer, where m and n generally range from 1 to 5.

Materials having an A2 and B2-ordered crystalline structure and a lattice constant suitable for inducing epitaxial growth of the magnetic layer 16 can be used in the present invention. Suitable materials include Cr, and Cr alloys having an A2 structure, such as CrV, CrTi, CrMo, and CrW, and B2-ordered structure materials, such as NiAl and FeAl. C)ther phases having a B2-ordered structure and lattice constants that are comparable to that of NiAl (a=0.2887 nm), FeAl (a=0.291 nm) and Cr (a=0.2884 nm) are also considered to be good candidates, for the underlayer of the present invention. The materials are AlCo (a=0.286 nm), FeTi (a=0.298 nm), CoFe (a=0.285 nm), CoTi (a=0.299 nm), CoHf (a=0.316 nm), CoZr (a=0.319 nm), NiTi (a=0.301 nm), CuBe (a=0.270 nm), CuZn (a=0.295 nm), AlMn (a=0.297 nm), AlRe (a=0.288 nm), AgMg (a=0.328 nm), and Al$_2$FeMn$_2$ (a=0.296 nm). The underlayer 14 is preferably Cr or NiAl that is about 10–200 nm (100–2000 Å) thick.

The underlayer 20 may also be comprised of two or more layers of different materials within the foregoing list. For example, it is believed that a multiple layer having a first layer of NiAl and a second layer of Cr, a Cr alloy, FeAl, AlCo, FeIi, CoFe, CoTi, CoHf, CoZr, NiTi, CuBe, CuZn, AlMn, AlRe, AgMg or Al$_2$FeMn$_2$ may be used. Various combinations of material can be used to produce the multiple layers, wherein each layer is one of the aforementioned underlayer materials.

The intermediate layer 22 and the inner layer 30 can be comprised of materials selected from the same group of materials used for the underlayer 20. In a current preferred embodiment, no intermediate layer 22 is used and the CrMn layer 14 is in contact with the magnetic layer 16. Also, only one magnetic layer 16 is used; therefore, no inner layers 30 are used in a current preferred embodiment.

The overlayer 24 may be provided adjacent to and preferably in contact with the magnetic layer 16 or 16". The overlayer 24 is preferably 1–10 nm (10–100 Å) thick and may be made of W, Ta, Zr, Ti, Y, Pt, Cr, Mn, Mn alloy or any combination thereof.

The overcoat 26 may be provided external to the overlayer 24, so that the overlayer 24 is positioned between the magnetic layer 16 or 16" and the overcoat 24, as shown in FIGS. 1(b) and (c). The overcoat 26 provides a mechanical wear layer and is 2.5–30 nm (25–300 Å) thick. It is preferably made of a ceramic material or diamond like carbon, such as SiO$_2$, SiC, CH$_x$ or CN$_x$ (where x <1), ZrO$_2$, or C. The organic lubricant 28 may be disposed on the overcoat 26. The lubricant 28 is 1 nm to 10 nm (10 to 100 Å) thick and is preferably a fluoro-chlorocarbon or a perfluoroether. Examples include CCl$_2$FCClF$_2$, CF$_3$(CF$_2$)$_4$CF$_3$, CF$_3$(CF$_2$)$_5$CF$_3$, CF$_3$(CF$_2$)$_{10}$CF$_3$, and CF$_3$(CF$_2$)$_{16}$CF$_3$.

Testing was performed to evaluate a number of magnetic films incorporating a CrMn alloy layer. All films were prepared by radio frequency (RF) diode sputtering, but could have just as easily been prepared by RF or direct current (DC) magnetron sputtering. Multilayered films were deposited sequentially without venting the chamber. The typical conditions for the RF diode deposition process were a base pressure before sputtering was 5×10$^{-7}$ Torr or better and the sputtering pressure of the Argon gas was 10 mTorr. Sputtering was performed at a fixed AC power of 100 watts (2.3 W/cm$^2$). Smooth (non-textured) Corning 7500, glass, NiP-Aluminum, oxidized (111)Si substrates were used for preparing all the films unless stated otherwise. Substrates were cleaned twice in each of the three separate ultrasonic baths of acetone, 2-propanol and deionized water.

The CoCoPt target was a CoCr alloy target with bonded Pt chips; the CrMn target was a pure Cr target with bonded Mn chips. The Cr target was 99% pure. The CoCrPt films were sputtered with a −100 V substrate bias and inductively coupled plasma (ICP) analysis of the Co alloy film revealed a composition of 78.5 at % Co, 9 at % Cr and 12.5 at % Pt. All other films were sputtered without substrate bias. Substrate heating was applied by heating the platform on which the substrate was situated. Depositions were made after the temperature of the substrate and platform reached equilibrium in about 60 min.

Typical deposition rates were CoCrPt; 13.3 nm/min, Cr: 13 nm/min, CrMn: 10 nm/min, and MgO: 4 nm/min. A Tencor Alpha Stiep Profilometer was used to measure the film thicknesses and to calibrate thin film deposition rates. Film microstructures were studied by transmission electron microscopy (TEM), atomic force microscopy (AFM) and by symmetrical x-ray diffractometry θ–2θ scan with Cu Kα radiation. TEM specimens were prepared by mechanical lapping and dimpling followed by ion-milling. The in-plane bulk magnetic properties of the thin films were measured on square specimens of 9 mm×9 mm by vibrating sample magnetometry (VSM). At magnetic field of up to 10 kOe was applied in the film plane, which was large enough to saturate the magnetization.

Figure 3:
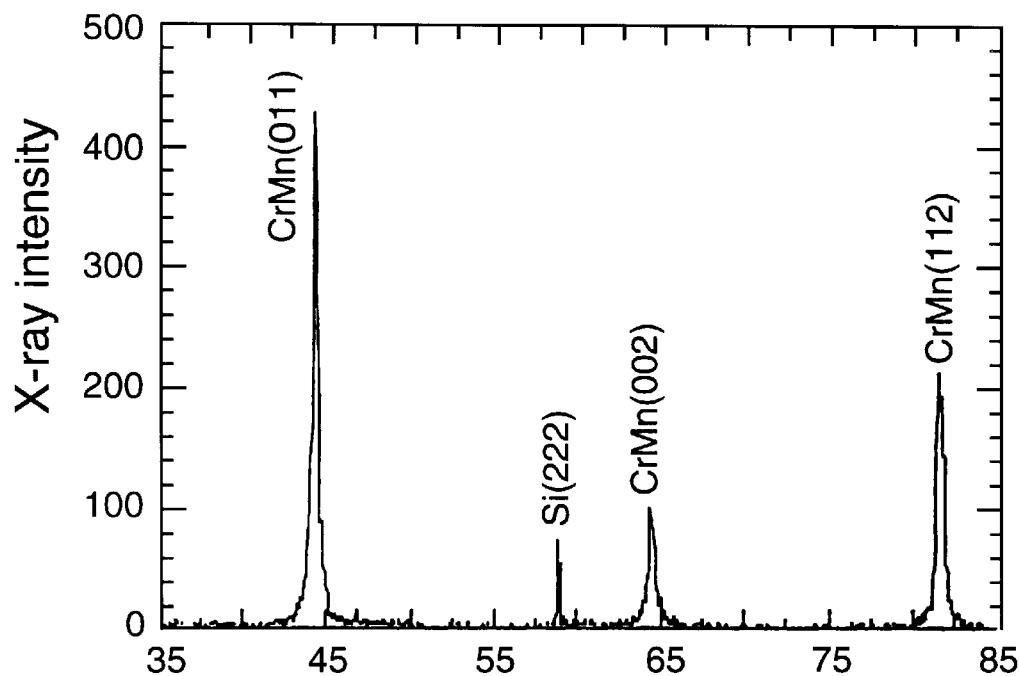
FIG. 3 shows x-ray diffraction scan of a 4 micron thick CrMn film on an oxidized Si substrate using Cu Kα x-rays.

A pure Cr target with bonded Mn chips was used to sputter deposit CrMn films. The composition of the CrMn thin film determined by ICP spectroscopy analysis is found to be 22 at % Mn using TEM. X-ray diffraction θ–2θ scans of the sputtered CrMn films on substrates showed that it has almost the same lattice constant as that of a pure Cr film. FIG. 3 shows the x-ray θ–2θ scan of an approximately 4 micron thick CrMn film. The lattice constant calculated from the x-ray scan of FIG. 3 is approximately 0.288 nm, which is essentially equal to the lattice constant of pure Cr (0.2884 nm).

Figure 4:
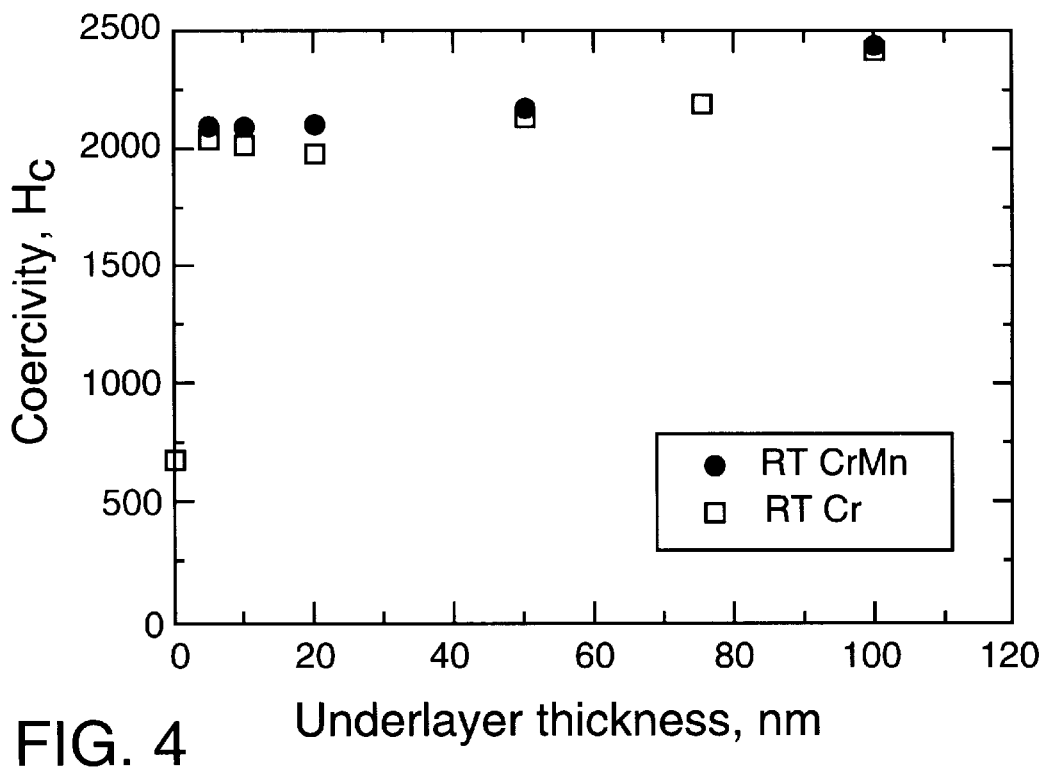
FIG. 4 shows in-plane coercivities of 40 nm thick CoCrPt films on CrMn and Cr underlayers of various thicknesses on unheated smooth glass substrates.

In another series of tests, thin films of CoCrPt on Cr and CrMn underlayers were deposited onto the substrates with the substrate at room temperature (RT). X-ray diffractometry studies were performed, which showed virtually no difference in thin film textures of the CoCrPt films deposited on Cr and CrMn underlayers. The in-plane magnetic properties of the films were compared. As shown in FIG. 4, the CoCrPt/CrMn films had coercivity values, measured using VSM, that were equal to the CoCrPt/Cr films for all film thickness within experimental error. Differences among other VSM measured properties such as S* and M$_r$t, within experimental error, were also negligible.

Figure 5:
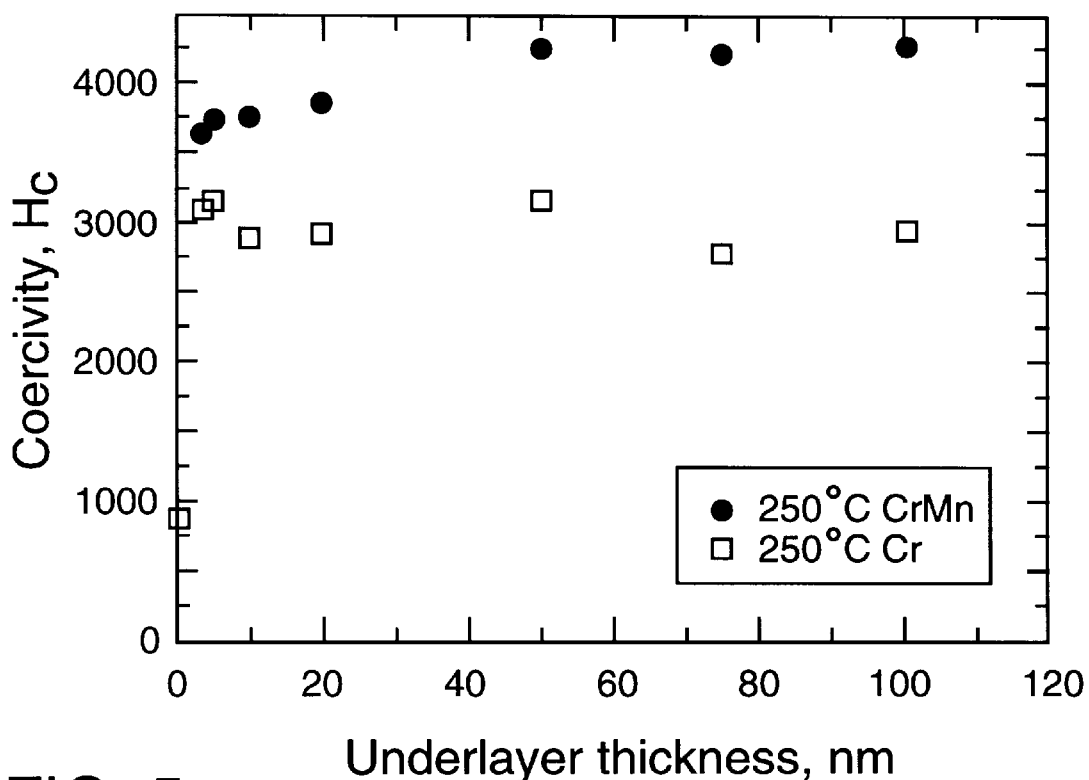
FIG. 5 shows in-plane coercivities of 40 nm thick CoCrPt on CrMn and Cr underlayers of various thicknesses on smooth glass substrates with substrate preheating at 250° C.

Additional experiments were performed in which CoCrPt films with the Cr or the CrMn underlayers were sputter deposited on substrates that had been preheated to 250° C. before sputtering. FIG. 5 is a plot of the in-plane coercivity, H$_c$, versus underlayer thickness for fixed thickness (40 nm) CoCrPt films. The in-plane magnetic properties of 40 nm thick CoCrPt films on various thicknesses of CrMn and Cr underlayers are presented in Tables 1 and 2, respectively, where t is the thickness of the magnetic layer.

TABLE 1

| CrMn thickness | H$_c$, Oe | M$_r$/M$_s$ | S* | M$_r$t memu/cm$^2$ |
|---|---|---|---|---|
| 100 nm | 4315 | 0.90 | 0.90 | 0.87 |
| 75 nm | 4258 | 0.85 | 0.88 | 0.84 |
| 50 nm | 4280 | 0.87 | 0.89 | 0.88 |
| 20 nm | 3913 | 0.89 | 0.89 | 0.95 |
| 10 nm | 3808 | 0.91 | 0.89 | 0.97 |
| 5 nm | 3782 | 0.87 | 0.89 | 1.06 |
| 3 nm | 3695 | 0.88 | 0.89 | 1.06 |
| 0 nm | 865 | 0.84 | 0.92 | 1.26 |

TABLE 2

| Cr thickness | H$_c$, Oe | M$_r$/M$_s$ | S* | M$_r$t memu/cm$^2$ |
|---|---|---|---|---|
| 100 nm | 2961 | 0.85 | 0.77 | 0.93 |
| 75 nm | 2792 | 0.82 | 0.78 | 0.82 |
| 50 nm | 3202 | 0.85 | 0.82 | 0.91 |
| 20 nm | 2953 | 0.83 | 0.85 | 0.99 |
| 10 nm | 2925 | 0.84 | 0.86 | 1.03 |
| 5 nm | 3162 | 0.87 | 0.88 | 1.05 |
| 3 nm | 3092 | 0.86 | 0.88 | 1.11 |
| 0 nm | 865 | 0.84 | 0.92 | 1.26 |

The coercivities of CoCrPt/CrMn films are all higher than that of the CoCrPt/Cr films and the difference increases as the underlayer thickness increases. A coercivity of 4280 Oe was measured for a CoCrPt film on a 50 nm thick CrMn underlayer, which is substantially higher than the 3202 Oe measured for a similar CoCrPt/Cr film. Only a 3 nm thick CrMn underlayer is needed for the CoCrPt to reach a coercivity of 3690 Oe which is higher than the highest value obtained with any Cr underlayer. In addition to generally high $H_c$ values, slightly higher S* and $M_r/M_s$, values and lower $M_r t$ values are observed in the CoCrPt/CrMn films than the CoCrPt/Cr films.

Figure 6:
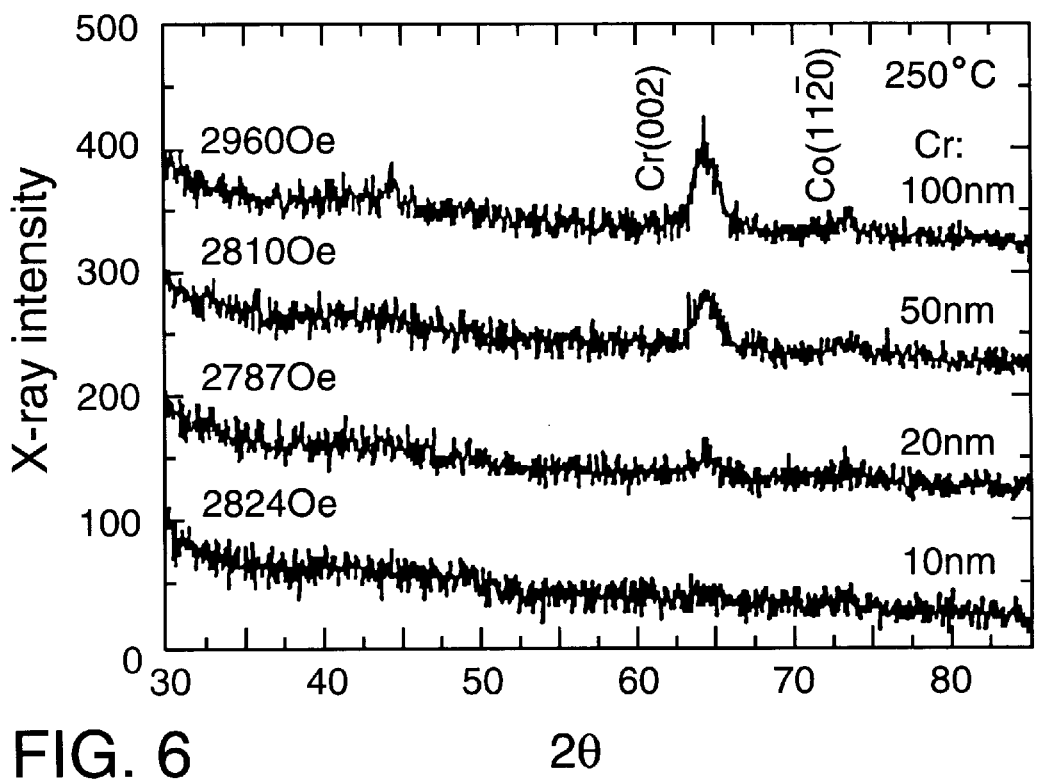
FIG. 6 shows x-ray diffraction spectra of 40 nm thick CoCrPt films on various thicknesses of Cr underlayers on 250° C. preheated smooth glass substrates.
Figure 7:
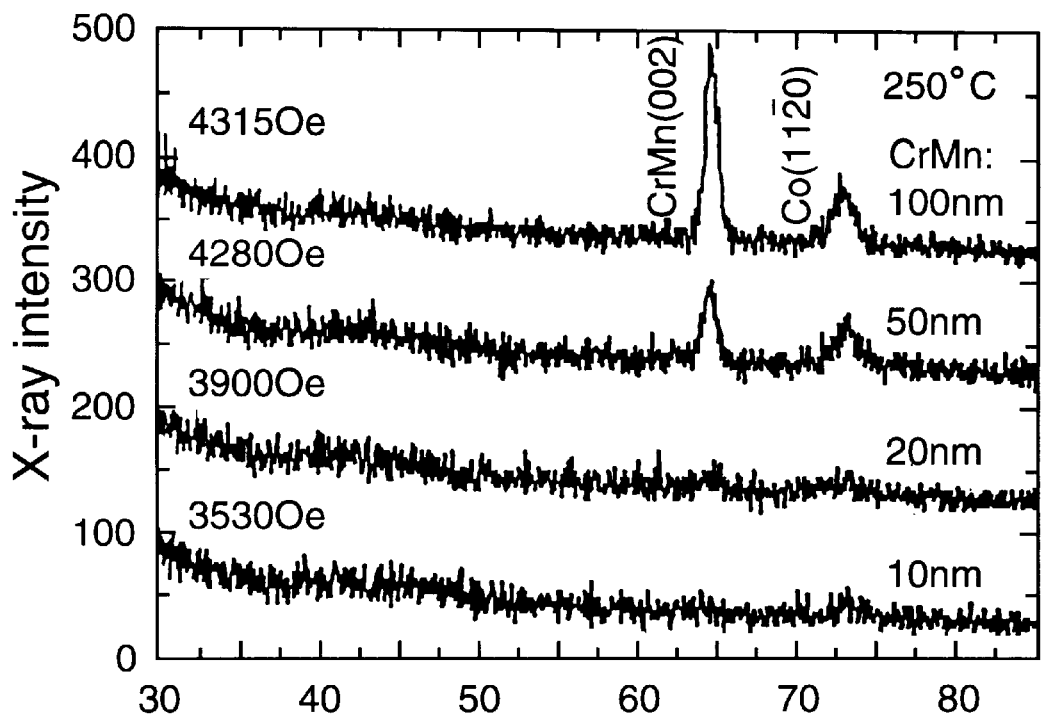
FIG. 7 shows x-ray diffraction spectra of 40 nm CoCrPt films on various thicknesses of CrMn underlayers on 250° C. preheated smooth glass substrates.

The crystallographic textures of a few selected films from Tables 1 and 2 were compared. FIGS. 6 and 7 show x-ray diffraction scans of 40 nm CoCrPt films on 10, 20, 50 and 100 nm Cr and CrMn underlayers. The substrate heating induces a (002) texture in both the Cr and the CrMn films as the film thickens which, in turn, induces the epitaxial growth of the (1120) CoCrPt texture. The higher coercivities of the CoCrPt films on CrMn underlayers may be attributable, in part, to the strong (1120) textures of the films. However, the CoCrPt films on the thin CrMn underlayers in FIG. 7 (such as the CoCrPt film on 20 nm CrMn) do not have stronger (1120) peaks, but still have significantly higher coercivities than the CoCrPt/Cr films.

Figure 8:
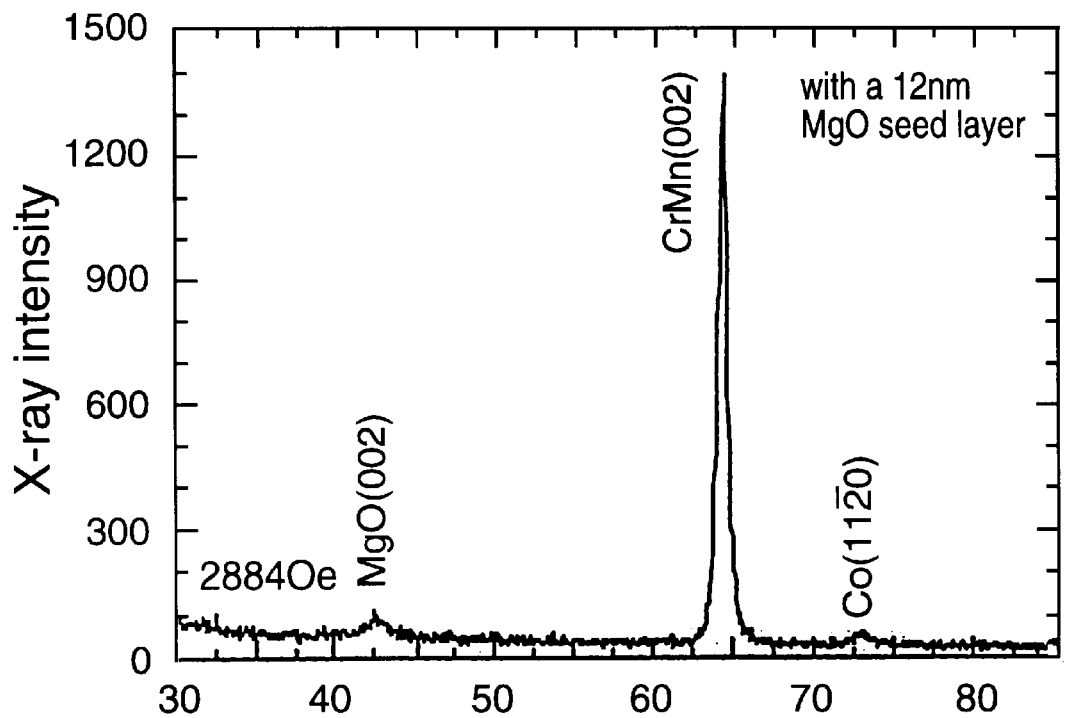
FIG. 8 shows x-ray diffraction of a CoCrPt(40 nm)/CrMn (100 nm) film on a MgO seed layer prepared on an unheated smooth glass substrate.

An alternative way to obtain stronger (002) texture in the CrMn films is by employing a MgO seed layer. A CoCrPt(40 nm)/CrMn(100 nm) film was deposited at room temperature, without intentional heating, onto a 12 nm thick MgO seed layer on a glass substrate to investigate whether a stronger (002) textured CrMn underlayer would enhance the coercivity of the CoCrPt films. FIG. 8 shows the x-ray diffraction scan of the CoCrPt(40 nm)/CrMn(100 nm)/MgO(12 nm) film on a glass substrate and the corresponding coercivity. As can be seen in FIG. 8, a much stronger (002) textured CrMn underlayer was obtained using the seed layer, although no strong (1120) CoCrPt peak was observed as in the comparable film deposited at 250° C.

The coercivity of the film, 2884 Oe, is substantially greater than coercivities of either the CrMn or Cr underlayer deposited at room temperature. Although the CoCrPt/CrMn/MgO film had a stronger (002) texture, the coercivity of the film was less than all of the CoCrPt/CrMn films deposited without a seed layer and with the substrate preheated to 250° C. The relative improvement in the magnetic properties indicate that when CrMn alloy underlayers are employed that both the texture and the temperature are important variables that can be controlled separately to produce films having high coercivity and other magnetic properties.

Additional testing was performed to investigate the effect of intermediate layers on the magnetic properties of films having CrMn and Cr underlayers. Films were produced by inserting thin (2.5 nm) layers of Cr and CrMn between the magnetic layer and the underlayer of CoCrPt/CrMn and CoCrPt/Cr, respectively, with a substrate preheating of 250° C. As shown in Table 3, the coercivity of the CoCrPt/CrMn film was decreased from 4315 Oe to 3899 Oe due to the Cr layer insertion, while the coercivity of the CoCrPt/Cr film was raised from 2961 Oe to 3393 Oe due to the CrMn layer insertion.

TABLE 3

| In-Plane Magnetic Properties | CrMn Underlayer | | Cr Underlayer | |
| --- | --- | --- | --- | --- |
| | no Cr intermed. Layer | Cr intermed. Layer | CrMn intermed. Layer | no CrMn intermed. Layer |
| $H_c$, Oe | 4315 | 3899 | 3393 | 2961 |
| $M_r/M_s$ | 0.90 | 0.86 | 0.86 | 0.85 |
| S* | 0.90 | 0.88 | 0.82 | 0.77 |
| $M_r t$, memu/cm² | 0.87 | 0.92 | 1.02 | 0.93 |

The introduction of a Cr intermediate layer between the magnetic layer and the CrMn underlayer resulted in a decrease in the coercivity compared to the film with only a CrMn underlayer. However, the film with the CrMn underlayer and the Cr intermediate layer had a coercivity that was still substantially higher than the film using only Cr as the underlayer. In contrast, the use of CrMn as an intermediate layer with a Cr underlayer substantially increased the coercivity in comparison with the film having only a Cr underlayer. One will appreciate from these results that the Mn-containing layer can be effectively deployed as an underlayer, an intermediate layer, and, presumably, as an inner layer or overlayer depending on the particular film that is to be created and the desired magnetic properties of the film.

Because the Cr and CrMn intermediate layers deposited were thin, the crystal structures and lattice constants of the CoCrPt/CrMn and CoCrPt/Cr films should not have been appreciably changed by the intermediate layers. Therefore, the magnetic property changes in the media are most likely due to the change of composition of the interfacial layer that is substantially in contact with the magnetic layer. In addition, it was noted above that the same film exhibits different magnetic properties when deposited at different temperatures although there does not appear to be a substantial change in the film texture. The observed variations in the magnetic properties indicates that interlayer diffusion of the elements in the film is occurring at the magnetic layer interface. In this regard, it will be recognized by one reasonably skilled in the art that very thin non-Mn-containing layers may be placed between the Mn-containing layer and the magnetic layer to act as a diffusion moderating barrier layer to limit and control the diffusion rate of the Mn from the Mn-containing layer to the magnetic layer grain boundaries.

Figure 2E:
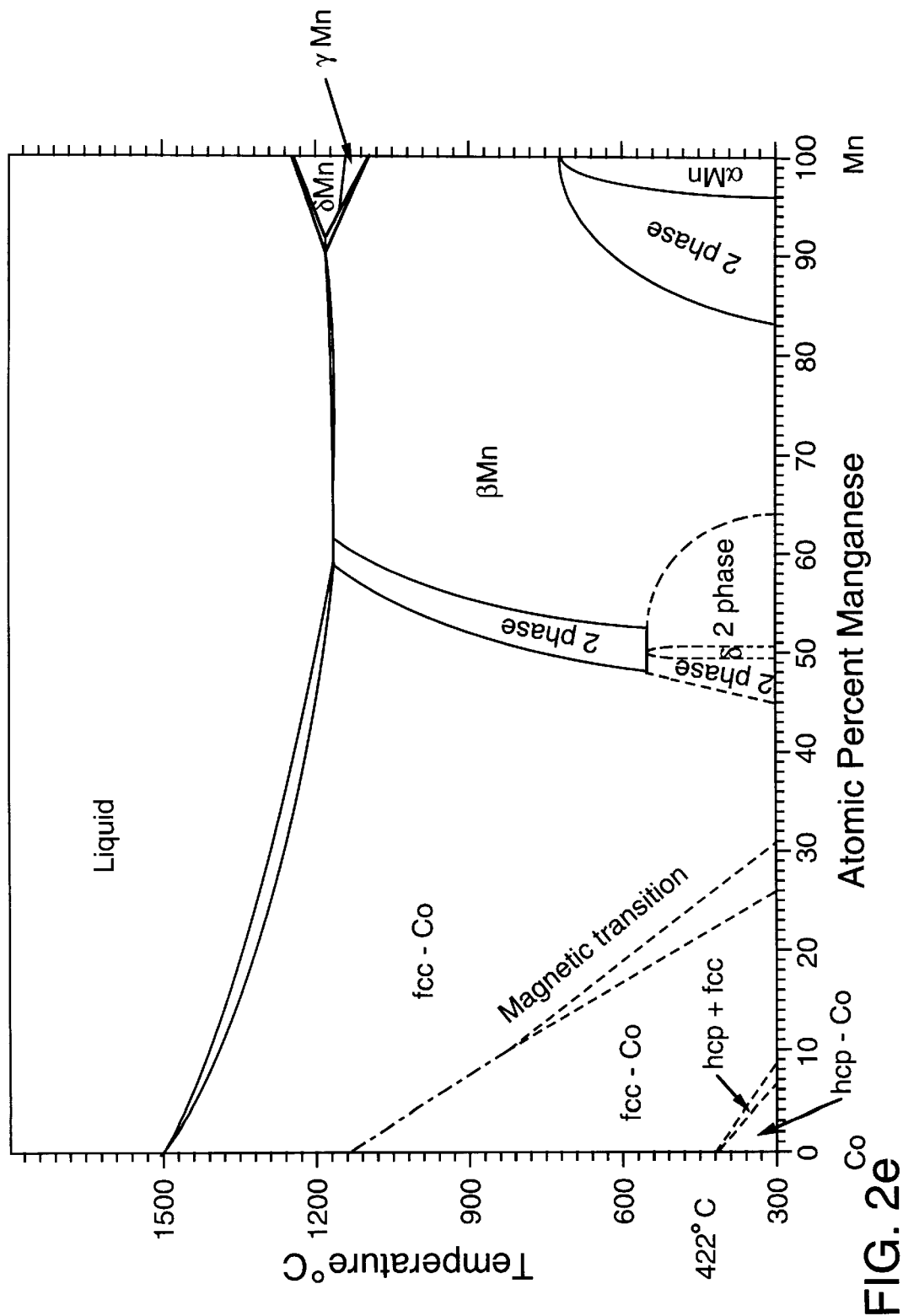
FIG. 2e shows Co—Mn equilibrium phase diagram.

FIG. 2e shows the binary phase diagram between Co and Mn. The relative small region of HCP CoMn ($\epsilon$-Co) and the negative slope of the phase boundary between the HCP CoMn and the FCC CoMn ($\alpha$-Co) with respect to Mn content is supportive of the concept that as the temperature and the Mn concentration is increased that a large fraction of the diffused Mn will want to remain at the grain boundaries of the epitaxially grown HCP Co-alloy grains.

Generally, interlayer diffusion will increase at higher temperatures and smaller diffusion lengths and will decrease at lower temperatures and greater diffusion lengths. The variations in magnetic properties implies that Mn from the layer substantially in contact with the CoCrPt layer may be diffusing into the grain boundaries or the grains of the Co-alloy layer. The Mn diffusing into the magnetic layer may serve to further separate the Co-alloy grains resulting in an increase in the coercivity of the film. In contrast, the variations observed to date do not imply that interlayer diffusion of Cr from the underlayer to the magnetic layer is strongly controlling the magnetic properties of the films.

Based on the above results, testing was performed to investigate whether a similar improvement in the magnetic properties could be produced if Mn were directly incorporated into the magnetic layer. A film was produced by sputter depositing a CoCrPt magnetic underlayer containing approximately 5 at % Mn onto a Cr underlayer. The sputtering was performed by adding Mn chips onto the CoCrPt target. The coercivies of the resulting film decreased approximately 50% for the CoCrPtMn/Cr films sputtered on heated (250° C.) smooth glass substrates, while the coercivities dropped about 15% for films deposited on unheated glass substrates.

Differences between CoCrPtMn/Cr and CoCrPt/CrMn films would be expected because of the varying distributions of Mn in the two films. For example, Mn most likely has substantially different diffusion characteristics when diffusing from a 5 at % Mn CoCrPtMn layer to Cr layer than from a 22 at % CrMn layer to a CoCrPt layer. Because the relative spatial distribution of Mn in the films is different, the resulting magnetic properties of the films would be expected to be different. It may also be possible that the interlayer diffusion of Mn is providing a homogenizing effect on the interfacial structure of the layers that may be serving to further separate and help align the grains in the magnetic layer.

Figure 9:
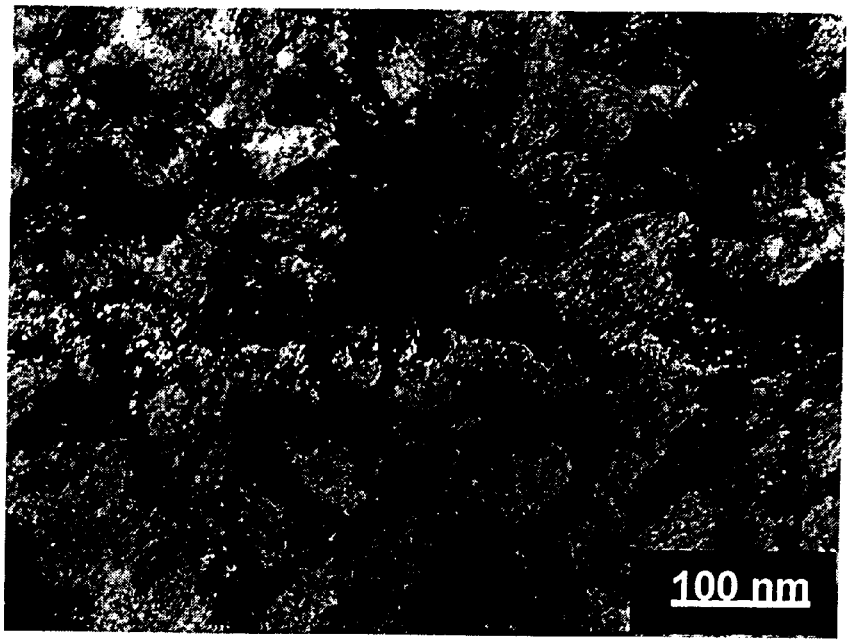
FIG. 9 shows a TEM bright field micrograph of a 100 nm thick Cr film deposited on a smooth glass substrate at 250° C.
Figure 10:
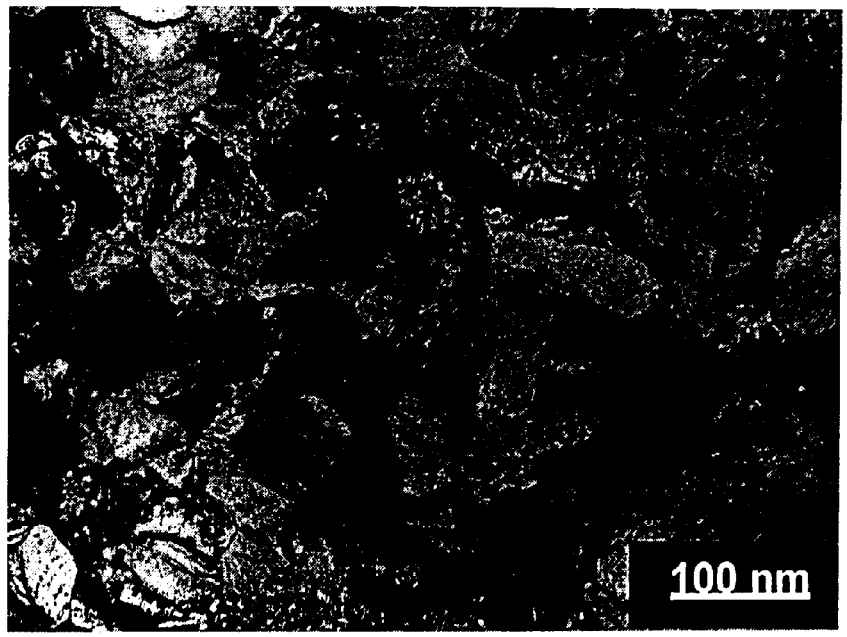
FIG. 10 shows a TEM bright field micrograph of a 100 nm thick CrMn film deposited on a smooth glass substrate at 250° C.

The microstructure of the CrMn and Cr film sputtered on preheated substrates were compared using TEM. FIGS. 8 and 9 are TEM bright field micrographs of 100 nm thick Cr and CrMn films deposited on 250° C. preheated smooth glass substrates, respectively. Both films show grains with similar average sizes of greater than approximately 50 nm. The CrMn film has slightly more well defined grains than the Cr film.

Figure 11:
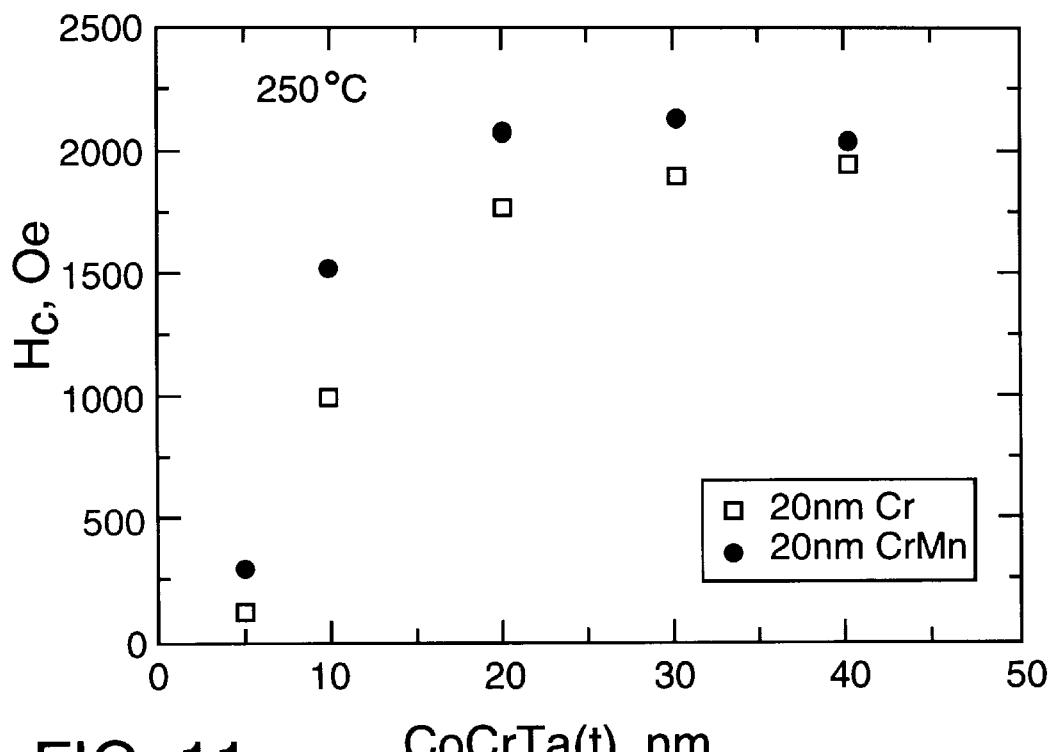
FIG. 11 shows in-plane coercivities of various thicknesses of CoCrTa films on 20 nm CrMn and Cr underlayers on smooth glass substrates with the substrate preheated to 250° C.
Figure 12:
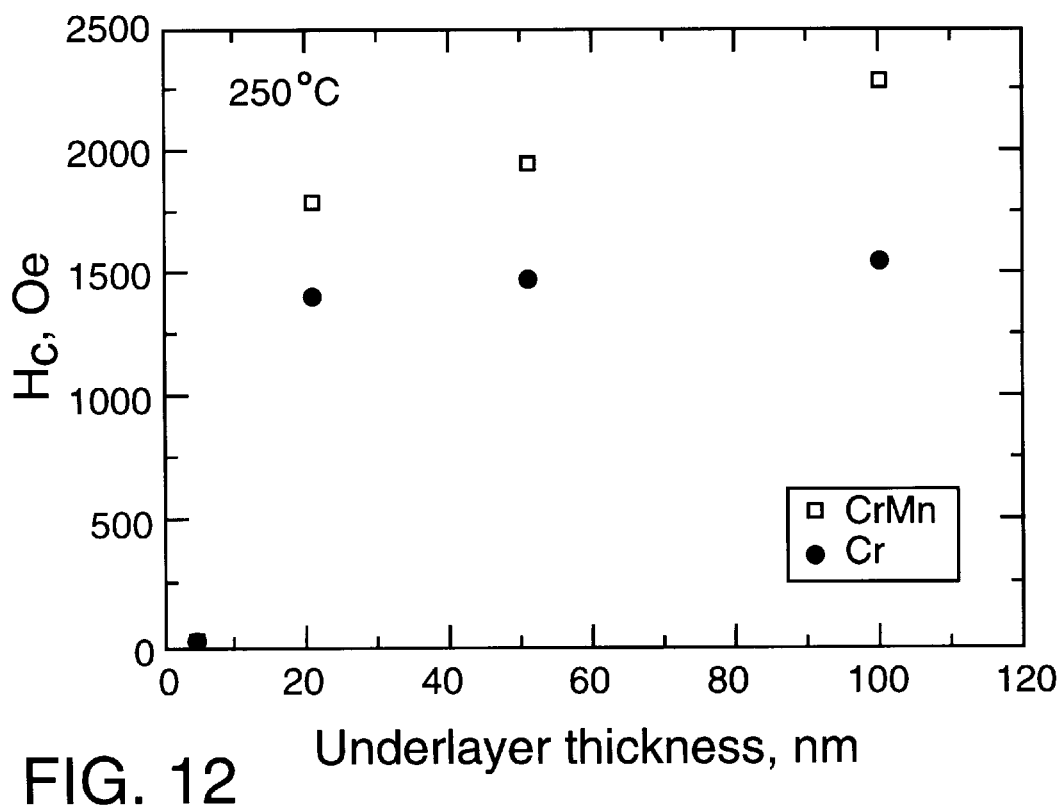
FIG. 12 shows in-plane coercivities of 15 nm thick CoCrTa films on CrMn and Cr underlayers of various thicknesses on smooth glass substrates with the substrate preheated to 250° C.

CoCrTa alloys are also commonly used for the magnetic media. Therefore, additional testing was performed to evaluate the general applicability of the Mn-containing layers to Co alloys. A series of $CoCr_{12}Ta_2$ films on CrMn underlayewrs were studied. Due to the experience from the previous CoCrPt films, all of the CoCrTa/CrMn films were sputter deposited onto 250° C. preheated substrates. FIG. 11 shows the plot of in-plane coercivities of various thicknesses of CoCrTa films on a fixed thickness (20 nm) of Cr and CrMn underlayers. Similar improvement in H, as in the CoCrPt/CrMn films was also observed, although to a lesser extent. The coercivities of the CoCrTa films on CrMn underlayers were always higher than that of the CoCrTa films on Cr underlayers. The largest coercivity improvement was observed with an approximately 10 nm CoCrTa thick magnetic layer on the CrMn underlayer. FIG. 12 compares 15 nm thick CoCrTa films on various thicknesses of Cr and CrMn underlayers sputter deposited on preheated smooth glass substrates. Again, higher coercivities were found in films with CrMn underlayers than films with Cr underlayers. The improvement in coercivity increases as the underlayer thickness increases. For example, the coercivity of the CoCrTa (40 nm)/CrMn(20 nm) film is about 700 Oe higher than that of a similar CoCrTa/Cr film.

Figure 13:
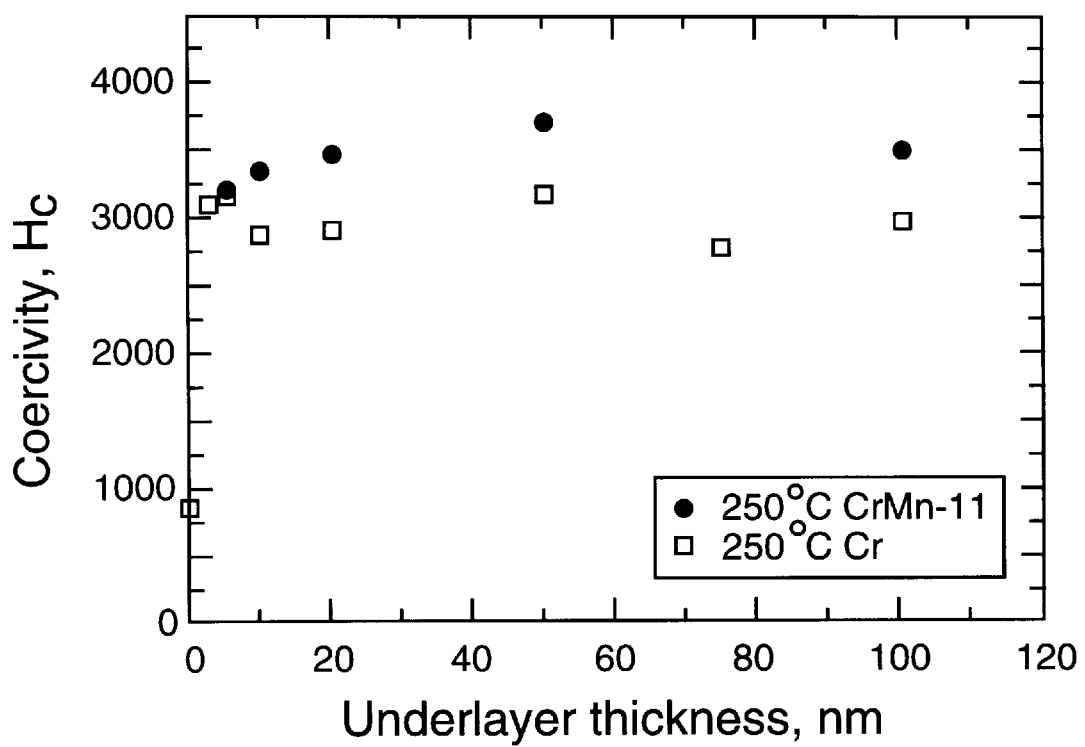
FIG. 13 shows a comparison of the in-plane coercivities of 40 nmn thick CoCrPt films on various thicknesses of Cr and CrMn-11 (11 at % Mn) underlayers.

The Mn content of the CrMn underlayer was also altered to check its compositional effects. The Mn chips on the Cr target were adjusted to produce sputtered films with an estimated composition of approximately 11 at % Mn, designated as CrMn-11. A series of CoCrPt/CrMn-11 films were deposited onto 250° C. preheated smooth glass substrates. The CoCrPt film coercivities vs. CrMn-11 underlayer thicknesses are plotted in FIG. 13 in comparison with similar films on Cr underlayers. It is found that the films with the CrMn-11 underlayers all have higher coercivities than the films with Cr underlayers. When the underlayer thickness is higher than 10 nm, the coercivities of the CoCrPt/CrMn-11 films are 500 Oe higher than that of the CoCrPt/Cr films. The increase in the coercivity of the film is less for the CoCrPt/CrMn-11 films than for the CoCrPt/CrMn films having approximately 22% Mn.

Another sputter deposited CrMn film having approximately 28% Mn content, designated CrMn-28, was prepared. All films with the CrMn-28 underlayers showed lower coercivities than the corresponding CoCrPt/Cr, CoCrPt/CrMn and CoCrPt/CrMn-11 films. The coercivity of a CoCrPt(40 nm)/CrMn-28(50 nm) film deposited on a 250° C. preheated smooth glass substrate was found to be 2650 Oe, which is ~38% lower than that of a similar CoCrPt/CrMn film (which has a coercivity of 4280 Oe). X-ray diffraction θ–2θ scans of a thick CrMn-28 film on a glass substrate showed an extra peak occurred at 2θ=39.18°. The peak may be (002) diffraction peak of the body center tetragonal α" phase based on the phase diagram, although a single diffraction peak can not provide enough information to completely identify the phase. The appearance of this second phase appears to deteriorate the epitaxy of the Co alloy.

Those of ordinary skill in the art will appreciate that a number of modifications and variations that can be made to specific aspects of the method and apparatus of the present invention without departing from the scope of the present invention. Such modifications and variations are intended to be covered by the foregoing specification and the following claims.

What is claimed is:

1. A magnetic recording medium comprising:

a substrate;

a Co or Co alloy film forming a magnetic recording layer, said Co or Co alloy forming a plurality of crystalline grains having boundaries therebetween; and a Mn-containing layer comprised of manganese or a solid solution Mn alloy layer disposed between said substrate and said magnetic layer to provide an epitaxial crystalline structure in said magnetic layer, wherein said Mn is present in an amount sufficient for diffusion thereof along the grain boundaries in said magnetic layer such that magnetic exchange coupling between grains is reduced.

2. The recording medium recited in claim 1 wherein said magnetic layer has a magnetic c-axis oriented substantially parallel to said magnetic layer.

3. The recording medium recited in claim 1 wherein:

said magnetic layer includes grains having grain boundaries; and, said Mn-containing layer is disposed in an effective amount to provide for diffusion of Mn into the grain boundaries of said magnetic layer.

4. The recording medium recited in claim 1 wherein said solid solution Mn alloy comprises a material selected from the group consisting of CrMn, VMn, TiMn, MnZn, CrMnMo, CrMnW, CrMnV, and CrMnTi.

5. The recording medium recited in claim 1 wherein said solid solution Mn alloy comprises CrMn.

6. The recording medium recited in claim 5 wherein said CrMn alloy is comprised of less than 28 at % Mn.

7. The recording medium recited in claim 5 wherein said CrMn layer is at least 3 nm thick.

8. The recording medium recited in claim 5 wherein said CrMn layer is comprised of 10–25 at % Mn.

9. The recording medium recited in claim 8 wherein said CrMn layer is 3–100 nm thick.

10. The recording medium recited in claim 1 wherein said Mn-containing layer is at least 3 nm thick.

11. The recording medium recited in claim 1 wherein said magnetic layer is comprised of a material selected from the group consisting of CoCrPt alloys and CoCrTa alloys.

12. The recording medium recited in claim 1 further comprising a seed layer disposed on said substrate.

13. The recording medium recited in claim 12 wherein said seed layer is comprised of a material selected from the group consisting of MgO having an (002) structure, Cr, and CrTi.

14. The recording medium recited in claim 12 wherein said seed layer is comprised of a material selected from the group consisting of Ti, TiCr and Pt.

15. The recording medium recited in claim 1 further comprising an underlayer disposed between said substrate and said Mn-containing layer comprised of a material selected to promote epitaxial crystalline structure in said magnetic layer.

16. The recording medium recited in claim 15 wherein said underlayer is comprised of a material selected from the group consisting of Cr, Cr alloys and a material having a c B2-ordered structure and a lattice constant substantially comparable to Cr.

17. The recording medium recited in claim 15 wherein said underlayer is comprised of a material selected from the group consisting of Cr, CrV, CrMo, CrW, CrTi, NiAl, AlCo, FeAl, FeTi, CoFe, CoTi, CoHf, CoZr, NiTi, CuBe, CuZn, AlMn, AlRe, AgMg, and $Al_2FeMn_2$.

18. The recording medium recited in claim 15 further comprising a plurality of underlayers comprised of two or more of said materials.

19. The recording medium recited in claim 1 further comprising an intermediate layer disposed between said substrate and said Mn-containing layer comprised of a material selected to promote epitaxial crystalline structure in said magnetic layer.

20. The recording medium recited in claim 19 wherein said intermediate layer is comprised of a material selected from the group consisting of Cr, Cr alloys and a material having a B2-ordered structure and a lattice constant substantially comparable to Cr.

21. The recording medium recited in claim 19 wherein said intermediate layer is comprised of a material selected from the group consisting of Cr, CrV, CrMo, CrW, CrTi, NiAl, AlCo, FeAl, FeTi, CoFe, CoTi, CoHf, CoZr, NiTi, CuBe, CuZn, AlMn, AlRe, AgMg, and $Al_2FeMn_2$.

22. The recording medium recited in claim 1 further comprising a second magnetic layer, wherein said magnetic layer lies between said second magnetic layer and said substrate.

23. The recording medium recited in claim 22 further comprising a Mn-containing inner layer disposed between said magnetic layer and said second magnetic layer.

24. A magnetic recording medium comprising:
   a substrate;
   a Co or Co alloy film forming a magnetic recording layer having an epitaxial crystalline structure, said Co or Co alloy forming a plurality of crystalline grains having boundaries therebetween; and
   a Mn-containing layer comprised of Mn or a Mn alloy in contact with said magnetic layer, wherein said magnetic layer is between said substrate and said Mn-containing layer and said Mn is present in an amount sufficient for diffusion thereof along the grains in said magnetic layer such that magnetic exchange coupling between said grains is reduced.

25. An apparatus for data storage comprising:
   a magnetic recording media comprising,
      a substrate;
      a Co or Co alloy film forming a magnetic recording layer, said Co or Co alloy forming a plurality of crystalline grains having boundaries therebetween; and
      a Mn-containing layer comprised of Mn or a solid solution Mn alloy in contact with said magnetic layer disposed between said magnetic layer and said substrate to provide an epitaxial growth of said magnetic layer, wherein said Mn is present in an amount sufficient for diffusion thereof along the grain boundaries in said magnetic layer such that magnetic exchange coupling between grains is reduced; and,
   a magnetic transducer positioned in close proximity to said medium to record and read data to and from said medium.

26. The apparatus recited in claim 25 wherein said medium further comprises an underlayer interposed between said Mn-containing layer and said substrate to promote epitaxial growth of said magnetic layer.

27. The apparatus recited in claim 26 wherein said underlayer is a material selected from the group consisting of Cr, CrV, CrMo, CrW, CrTi, NiAl, AlCo, FeAl, FeTi, CoFe, CoTi, ColFf, CoZr, NiTi, CuBe, CuZn, AlMn, AlRe, AgMg, and $Al_2FeMn_2$.

28. The apparatus recited in claim 25 wherein said Mn-containing layer is comprised of a CrMn alloy.

29. The apparatus recited in claim 25 wherein said medium is rotatable relative to said transducer.

30. The apparatus recited in claim 25 wherein said magnetic layer has an epitaxial crystalline structure grown from said Mn-containing layer.

31. A method for producing an epitaxial crystalline Co or Co alloy magnetic layer on a recording substrate, said method comprising:
   disposing a Mn-containing layer comprised of Mn or a solid solution Mn alloy on a substrate to provide for epitaxial growth of a Co or Co alloy magnetic layer;
   heating the Mn-containing layer; and,
   depositing the Co or Co alloy magnetic layer on the Mn-containing layer by sputter deposition, said Co or Co alloy forming epitaxial crystalline grains having boundaries therebetween;
   wherein the Mn in the Mn-containing layer is present in a amount, and the Mn-containing layer is heated to a degree, sufficient to promote interlayer diffussion of Mn from the Mn-containing layer along the grain boundries in the magnetic layer.

32. The method of claim 31 wherein said step of heating is performed during said step of producing the magnetic layer.

33. The method of claim 31 wherein said step of disposing further comprises disposing the Mn-containing layer in an effective amount to promote an epitaxial crystalline structure in a magnetic layer produced on the Mn-containing layer.

34. The method of claim 31 wherein said step of disposing further comprises disposing a Mn-containing layer comprised of a CrMn alloy on the substrate.

35. The method of claim 34 wherein said step of disposing further comprises disposing at least a 3 nm thick CrMn alloy layer on the substrate.

36. The method of claim 35 wherein said step of depositing the magnetic layer is carried out at a temperature of at least 250° C.

37. The method of claim 31 further comprising the step of interposing an intermediate layer between the Mn-containing layer and the magnetic layer.

38. The method of claim 31 further comprising the step of placing a seed layer on said substrate.

39. The method of claim 31 further comprising the step of providing an underlayer between the Mn-containing layer and the substrate.

40. The method of claim 39 wherein said step of providing comprises providing an underlayer comprised of a material selected from the group consisting of Cr, Cr alloys, and a material having a B2-ordered structure and a lattice constant substantially comparable to Cr.

* * * * *